(12) United States Patent
Kang et al.

(10) Patent No.: US 9,972,853 B2
(45) Date of Patent: May 15, 2018

(54) AIR SUPPLY CONTROL SYSTEM OF FUEL CELL

(71) Applicant: Hyundai Motor Company, Seoul (KR)

(72) Inventors: Min Su Kang, Paju-Gyeonggi-Do (KR); Chang Seok Ryu, Anyang-Gyeonggi-Do (KR); Sung Do Kim, Gyeonggi-Do (KR); Dong Hun Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 269 days.

(21) Appl. No.: 14/708,250

(22) Filed: May 10, 2015

(65) Prior Publication Data

US 2016/0164121 A1 Jun. 9, 2016

(30) Foreign Application Priority Data

Dec. 9, 2014 (KR) .................. 10-2014-0176009

(51) Int. Cl.
*H01M 8/04* (2016.01)
*H01M 8/04111* (2016.01)
(Continued)

(52) U.S. Cl.
CPC .... *H01M 8/04111* (2013.01); *H01M 8/04126* (2013.01); *H01M 8/04395* (2013.01);
(Continued)

(58) Field of Classification Search
CPC ............... H01M 8/04; H01M 8/04111; H01M 8/04395; H01M 8/04753; H01M 8/04126; H01M 2250/20; Y02T 90/32
See application file for complete search history.

(56) References Cited

U.S. PATENT DOCUMENTS

2003/0064271 A1* 4/2003 Stenersen .............. H01M 8/02
429/410
2006/0222912 A1* 10/2006 Smith ...................... C25B 9/18
429/418
(Continued)

FOREIGN PATENT DOCUMENTS

JP          2002056865    *  2/2002
JP          2007-016641 A     1/2007
(Continued)

OTHER PUBLICATIONS

JP2010055816MT.*
(Continued)

*Primary Examiner* — Alex Usyatinsky
(74) *Attorney, Agent, or Firm* — Mintz Levin Cohn Ferris Glovsky and Popeo, P.C.; Peter F. Corless

(57) ABSTRACT

Disclosed herein is a fuel cell system. The fuel cell system includes: a turbocharger configured to receive and pressurize air discharged from an outlet of a fuel cell and supply the pressurized air to an inlet of the fuel cell; a plurality of valves configured to be provided at an inlet and an outlet of the turbocharger to control an amount of air supplied to the turbocharger in the air discharged from the outlet of the fuel cell and control a pressure of air supplied from the turbocharger to the inlet of the fuel cell; and a controller configured to calculate an air pressure required for the fuel cell and control an opening of the valves based on the calculated air pressure required for the fuel cell.

11 Claims, 2 Drawing Sheets

(51) Int. Cl.
H01M 8/04119 (2016.01)
H01M 8/0438 (2016.01)
H01M 8/04746 (2016.01)

(52) U.S. Cl.
CPC .... *H01M 8/04753* (2013.01); *H01M 2250/20* (2013.01); *Y02T 90/32* (2013.01)

(56) References Cited

U.S. PATENT DOCUMENTS

2007/0072021 A1* 3/2007 Taniguchi ............... F01D 15/10
429/408
2011/0097632 A1 4/2011 Sumser et al.

FOREIGN PATENT DOCUMENTS

| JP | 2010-055816 A | 3/2010 |
|----|---------------|--------|
| JP | 2011-243408 A | 12/2011 |
| JP | 2013-185506 A | 9/2013 |
| KR | 10-2006-0070092 | 6/2006 |

OTHER PUBLICATIONS

JP2011243408MT.*
20140176009, Decision_to grant Patent_(Translated),Jul. 29, 2016.*

* cited by examiner

AIR SUPPLY CONTROL SYSTEM OF FUEL CELL

CROSS REFERENCE TO RELATED APPLICATION

The present application claims priority to Korean Patent Application No. 10-2014-0176009, filed Dec. 9, 2014, the entire contents of which is incorporated herein for all purposes by this reference.

TECHNICAL BACKGROUND

The present invention relates to a pressurized fuel cell system using a turbocharger.

BACKGROUND OF THE INVENTION

A fuel cell system may operate under an atmospheric pressure condition or a pressurized condition. For instance, the pressurized fuel cell system may use a compressor to supply air having a higher pressure than an atmospheric pressure to a cathode and include a separate pressure control device, such as a back pressure valve in a gas pipe which penetrates through the fuel cell stack, to increase the pressure in the fuel cell stack, thereby preventing a dry-out phenomenon of a fuel cell stack.

In the fuel cell pressurization system as described above, when an operation pressure of the fuel cell stack is variably changed, an amount of gases supplied to the fuel cell stack may increase in proportion to the output of the fuel cell stack. In this case, a flow rate of gas or an output may be measured and the measured values as electrical control signal may be transmitted to the pressure control device through a controller, such that the operation pressure of the fuel cell stack may be maintained at an appropriate level by the pressure control device.

However, a pressure difference formed by the back pressure valve may be a burden to an air compressor to reduce system efficiency.

The matters described as the related art have been provided only for assisting in the understanding for the background of the present invention and should not be considered as corresponding to the related art known to those skilled in the art.

SUMMARY OF THE INVENTION

Accordingly, the present invention provides a fuel cell system which may include a turbocharger mounted at an outlet side of a fuel cell to form a back pressure of the fuel cell. The fuel cell system may further include a valve to control a pressure of air supplied to the fuel cell.

According to an exemplary embodiment of the present invention, provided is a fuel cell system that may include: a turbocharger configured to receive and pressurize air discharged from an outlet of a fuel cell, and supply the pressurized air to an inlet of the fuel cell; a plurality of valves configured to be provided at an inlet and an outlet of the turbocharger to control an amount of air supplied to the turbocharger among the air discharged from the outlet of the fuel cell, and control a pressure of air supplied from the turbocharger to the inlet of the fuel cell; and a controller configured to calculate an air pressure required for the fuel cell and control an opening of the valves based on the calculated air pressure.

The fuel cell system may further include: an air compressor configured to control a flow rate of air supplied to the inlet of the fuel cell. In particular, the air pressurized by the turbocharger may be supplied to an inlet of the air compressor.

The fuel cell system may further include: a humidifier configured to humidify and discharge the air discharged from the outlet of the fuel cell. A portion of the air discharged from the humidifier may be supplied to the turbocharger.

The plurality of valves may include: a first valve configured to be disposed between the outlet of the fuel cell and the inlet of the turbocharger; and a second valve configured to be disposed between the inlet of the fuel cell and the outlet of the turbocharger.

The first valve may be a 3-way valve configured to control the air discharged from the outlet of the fuel cell such that an amount of air discharged to the outside and an amount of the air supplied to the turbocharger may be controlled.

The controller may calculate the air pressure required for the fuel cell based on an internal pressure of the fuel cell.

The controller may primarily control the amount of air supplied to the turbocharger depending on the calculated air pressure and further control the pressure of air supplied from the turbocharger to the inlet of the fuel cell.

The controller may control the opening of the first valve depending on the calculated air pressure. For example, as the calculated air pressure required for fuel cell increases, the opening of the first valve may be controlled, by the controller, to increase the amount of air supplied to the turbocharger in the air discharged from the outlet of the fuel cell.

The controller may control the opening of the second valve depending on the calculated air pressure. For example, as the calculated air pressure required for the fuel cell increases, the opening of the second valve may be reduced by the controller.

Further provided is a vehicle that comprises a fuel cell system as described herein.

Other aspects of the invention are disclosed infra.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a fuel cell system according to an exemplary embodiment of the present invention will be described with reference to the accompanying drawings.

Figure 1:
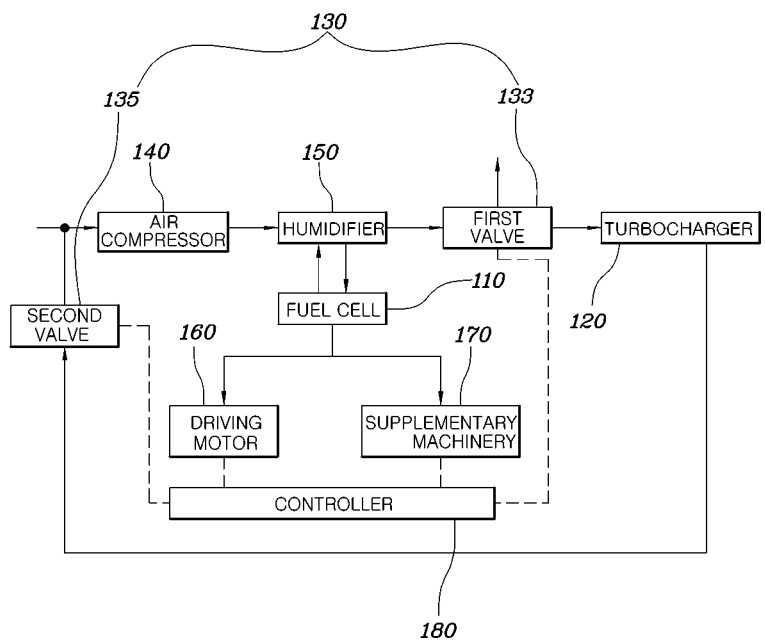
FIG. 1 illustrates an exemplary fuel cell system according to an exemplary embodiment of the present invention.
Figure 2:
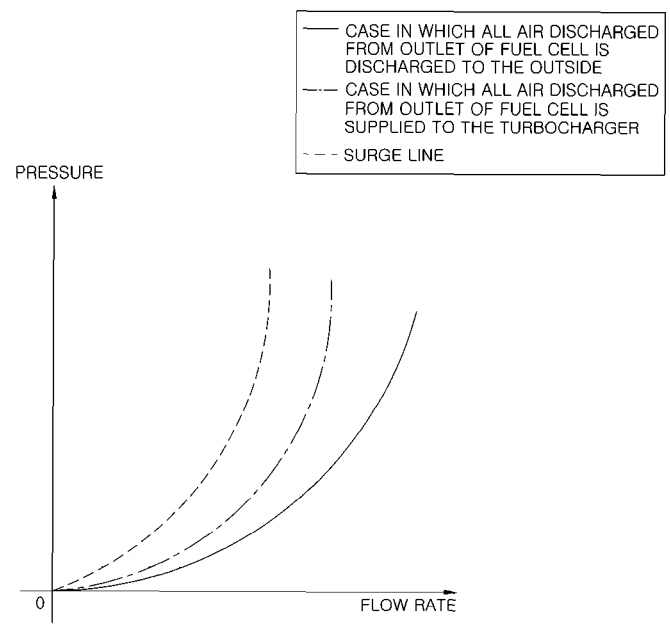
FIG. 2 is an exemplary graph illustrating pressure and flow rate performance of an air compressor by controlling a plurality of valves according to an exemplary embodiment of the present invention.

FIG. 1 illustrates an exemplary fuel cell system according to an exemplary embodiment of the present invention and FIG. 2 is an exemplary graph illustrating pressure and flow rate performance of an air compressor by controlling a plurality of valves according to an exemplary embodiment of the present invention.

As shown in FIGS. 1 and 2, the fuel cell system may include: a turbocharger 120 which may receive and pressurize air discharged from an outlet of a fuel cell 110, and supply the pressurized air to an inlet of the fuel cell 110; a plurality of valves 130 each of which may be provided at the inlet and the outlet of the turbocharger 120, and may control an amount of air supplied to the turbocharger 120 among the air discharged from the outlet of the fuel cell 110 and control a pressure of air supplied from the turbocharger 120 to the inlet of the fuel cell 110; and a controller 180 which may calculate an air pressure required for the fuel cell 110 and control an opening of the valves 130 depending on the calculated air pressure.

In the related arts, the conventional turbocharger 120 may be disposed to receive the exhaust air discharged from the air outlet of the fuel cell 110 to the outside and rotate a turbine, and then output sucked air at a strong pressure using a rotating force. As such, a pressurized type stack may be obtained by supplying the pressurized air to the fuel cell 110 to increase an operation temperature of the fuel cell 110 and form a difference pressure for maintaining humidity.

In particular, the plurality of valves 130 for controlling an amount of air discharged from the fuel cell 110 to the turbocharger 120 and controlling the discharge pressure of pressurized air that is supplied from the turbocharger 120 to the fuel cell 110 may be provided in the conventional fuel cell system, and thus the air pressure may be accurately formed as much as required by the fuel cell 110 by controlling the opening of the valves 130.

The fuel cell system according to the exemplary embodiment of the present invention further may include the air compressor 140 which controls the flow rate of air supplied to the inlet of the fuel cell 110. As such, the air pressurized by the turbocharger 120 may be supplied to the inlet of the air compressor 140. The fuel cell system may further include a humidifier 150 which humidifies and discharges the air discharged from the outlet of the fuel cell 110. Accordingly, a portion of the air discharged from the humidifier 150 may be supplied to the turbocharger 120.

According to the related arts, the back pressure valve and the air compressor which control the pressure of air to the fuel cell may be provided. However, the pressure control using the back pressure valve may provide as an excessive burden to the air compressor thereby reducing the system efficiency.

On the other hand, according to the exemplary embodiment of the present invention, the air discharged from the fuel cell 110 may join the air supplied to the fuel cell 110 to increase air supply flow rate and the back pressure of the air compressor 140, thereby substantially improving the system efficiency than the related art that uses the back pressure valve. Further, the air supplied from the turbocharger 120 in the pressurized state may increase the pressure of the inlet of the air compressor 140 such that a pressure difference in the air compressor 140 may be formed, thereby reducing the burden to the air compressor 140 and improving the system efficiency. In this case, when the output of the fuel cell 110 is required more, the air compressor 140 may increase the rotating speed, thereby increasing the flow rate of air supplied to the fuel cell.

The plurality of valves 130 may include a first valve 133 which is disposed between the outlet of the fuel cell 110 and the inlet of the turbocharger 120; and a second valve 135 which is disposed between the inlet of the fuel cell 110 and the outlet of the turbocharger 120. In particular, the first valve 133 may be a 3-way valve which controls the air discharged from the outlet of the fuel cell 110 such that an amount of the air supplied to the turbocharger 120 and an amount of the air discharged to the outside may be controlled.

In other words, when the atmospheric pressure operation of the fuel cell 110 is requested, the first valve 133 may be controlled to discharge all the air supplied from the fuel cell 110 to the outside as the controller 180 controls the opening. To the contrary, when the pressurization operation of the fuel cell 110 is requested, the first valve 133 may be controlled to supply all the air supplied from the fuel cell 110 to the turbocharger 120 as the controller 180 controls the opening.

Further, the second valve 135 may be provided to supply the air pressurized by the turbocharger 120 based on the pressure of the pressurized air that may be required for the fuel cell 110 and the opening of the second valve 135 may be controlled by the controller 180.

According to the above described configuration, the pressure of air supplied into the fuel cell 110 may be improved depending on the openings of the plurality of valves 130 and thus the burden to the air compressor 140 may be reduced.

The controller 180 according to an exemplary embodiment of the present invention may calculate the air pressure required for the fuel cell 110 based on an internal pressure of the fuel cell 110.

Generally, when the internal humidity of the fuel cell 110 is reduced, the dry-out phenomenon may occur seriously. Since the humidity of the fuel cell 110 has a close relationship with the internal pressure of the fuel cell 110, the internal pressure of the fuel cell 110 is appropriately maintained and thus the dry-out phenomenon of the fuel cell 110 may be prevented.

Accordingly, the controller 180 according to an exemplary embodiment of the present invention may calculate the required air pressure that corresponds to the internal pressure based on the internal humidity of the fuel cell 110 and control the openings of the plurality of valves 130 depending on the calculated air pressure required to maintain the appropriate internal pressure of the fuel cell 110. When the output of the fuel cell may not be implemented by controlling opening of the valves, the rotating speed of the air compressor 140 may be increased and thus the flow rate of air supplied to the fuel cell 110 may be increased, thereby supplying the desired air pressure to the fuel cell 110.

In this case, the controller 180 may primarily control the amount of air supplied to the turbocharger 120 depending based on the calculated air pressure and further, control the pressure of air supplied from the turbocharger 120 to the inlet of the fuel cell 110.

In other words, the controller 180 may control the opening of the first valve 133 based on the calculated air pressure required for the fuel cell 110. For example, as the calculated air pressure is increased, the controller may increase the amount of air supplied to the turbocharger 120 in the air discharged from the outlet of the fuel cell 110. Further, the controller 180 may control the opening of the second valve 135 based on the calculated air pressure. For example, as the calculated air pressure is increased, the opening of the second valve 135 may be reduced by the controller 180.

As illustrated in FIG. 2, when all the air discharged from the outlet of the fuel cell 110 is discharged to the outside, an increasing width of flow rate-pressure of the air compressor 140 may not be substantial under the atmospheric pressure condition of the fuel cell 110. When the air in the fuel cell 110 needs to be pressurized, the openings of the plurality of valves 133 and 135 may be controlled. For example, the opening of the first valve 133 may be controlled to supply all the air which is discharged from the outlet of the fuel cell 110 to the turbocharger 120. As consequence, as shown in FIG. 2, the flow rate-pressure value of the air compressor 140 may be increased.

When the opening of the first valve 133 is controlled to supply all the air discharged from the outlet of the fuel cell 110 to the turbocharger 120, the opening of the second valve 135 may be reduced and thus the pressure value to flow rate of the air compressor 140 may be increased to be gradually converged to a flow rate-pressure value curved line which corresponds to a surge line.

In particular, the flow rate of air supplied to the inlet of the fuel cell 110 may be increased or reduced based on the rotating speed of the air compressor 140. When the fuel cell 110 may not be obtained the required air pressure by controlling the openings of the first valve 133 and the second valve 135, the rotating speed of the air compressor 140 may be increased to provide air of the required pressure to the fuel cell 110.

According to the exemplary embodiment of the present invention, the openings of the first valve 133 and the second valve 135 are designed to be controlled till reaching the flow rate-pressure value curve line of the maximum surge line and are designed not to have the flow rate-pressure value higher than that, thereby preventing the failure of the fuel cell system.

According to various exemplary embodiments of the fuel cell system as described above, the discharged air from the fuel cell to the outside may be re-introduced to the fuel cell to form the pressure difference of the fuel cell without adding an additional air supply apparatus.

Further, the air supplied from the turbocharger may increase the pressure of the inlet of the air compressor to provide the pressure difference and the flow rate of the air compressor, thereby reducing the burden to the air compressor.

Further, the plurality of valves may be provided at the inlet and the outlet of the turbocharger, thereby improving the precise pressure controlling of the fuel cell.

Although the present invention has been shown and described with respect to particular exemplary embodiments, it will be obvious to those skilled in the art that the present invention may be variously modified and altered without departing from the spirit and scope of the present invention as defined by the following claims.

What is claimed is:

1. An air supply control system of a fuel cell, comprising:
   a turbocharger configured to receive and pressurize air discharged from an outlet of the fuel cell, and supply the pressurized air to an inlet of the fuel cell;
   a plurality of valves configured to be provided at an inlet and an outlet of the turbocharger and control an amount of air supplied to the turbocharger among the air discharged from the outlet of the fuel cell and control a pressure of air supplied from the turbocharger to the inlet of the fuel cell; and
   a controller programmed to calculate an air pressure required for the fuel cell and control an opening of the valves based on the calculated air pressure,
   wherein the plurality of valves include: a first valve configured to be disposed between the outlet of the fuel cell and the inlet of the turbocharger to control the amount of air supplied to the turbocharger; and a second valve configured to be disposed between the inlet of the fuel cell and the outlet of the turbocharger in control the pressure of air supplied from the turbocharger to the inlet of the fuel cell.

2. The air supply control system of a fuel cell of claim 1, further comprising:
   an air compressor configured to control a flow rate of air supplied to the inlet of the fuel cell,
   wherein the air pressurized by the turbocharger is supplied to an inlet of the air compressor.

3. The air supply control system of a fuel cell of claim 1, further comprising:
   a humidifier configured to humidify and discharge the air discharged from the outlet of the fuel cell,
   wherein a portion of the air discharged from the humidifier is supplied to the turbocharger.

4. The air supply control system of a fuel cell of claim 1, wherein the first valve is a 3-way valve configured to control the air discharged discharged from the outlet of the fuel cell such that an amount of air to the outside and an amount of the air supplied to the turbocharger are controlled.

5. The air supply control system of a fuel cell of claim 1, wherein the controller calculates the air pressure required for the fuel cell based on an internal pressure of the fuel cell.

6. The air supply control system of a fuel cell of claim 1, wherein the controller primarily controls, based on the calculated air pressure required for the fuel cell, the amount of air supplied to the turbocharger and further controls the pressure of air supplied from the turbocharger to the inlet of the fuel cell.

7. The air supply control system of a fuel cell of claim 1, wherein the controller controls an opening of the first valve based on the calculated air pressure required for the fuel cell.

8. The air supply control system of a fuel cell of claim 7, wherein, when the calculated air pressure required for the fuel cell is increased, the opening of the first valve is controlled, by the controller, to increase the amount of air supplied to the turbocharger in the air discharged from the outlet of the fuel cell.

9. The air supply control system of a fuel cell of claim 1, wherein the controller controls an opening of the second valve depending on the calculated air pressure required for the fuel cell.

10. The air supply control system of a fuel cell of claim 9, wherein when the calculated air pressure required for the fuel cell is increased, the opening of the second valve is controlled to be reduced by the controller.

11. A vehicle, comprising a fuel cell system of claim 1.

* * * * *